(12) United States Patent
Bolt (10) Patent No.: US 6,429,982 B2
(45) Date of Patent: *Aug. 6, 2002

(54) COUNTER-ROTATING ANAMORPHIC PRISM ASSEMBLY WITH VARIABLE SPACING

(75) Inventor: Bryan C. Bolt, Beaverton, OR (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,102

(22) Filed: Jul. 30, 1999

(51) Int. Cl.⁷ .............................. G02B 5/04; G02B 7/18; G02B 13/10
(52) U.S. Cl. .................... 359/831; 359/837; 359/669
(58) Field of Search ................. 359/669, 670, 359/831, 837, 900

(56) References Cited

U.S. PATENT DOCUMENTS

| | | | | |
|---|---|---|---|---|
| 818,553 A | * | 4/1906 | Phillips | |
| 1,307,598 A | * | 6/1919 | Phillips | |
| 1,680,534 A | * | 8/1928 | Garbutt et al. | |
| 1,758,801 A | * | 5/1930 | Moses | |
| 2,780,140 A | * | 2/1957 | Luboshez | |
| 2,810,323 A | * | 10/1957 | Coleman | |
| 3,450,464 A | * | 6/1969 | Guffon | |
| 3,572,929 A | * | 3/1971 | Hassibi | |
| 4,016,504 A | * | 4/1977 | Klauminzer | |
| 4,118,109 A | * | 10/1978 | Crawford et al. | |
| 4,319,807 A | * | 3/1982 | Horton | |
| 4,502,751 A | * | 3/1985 | Fjeldsted | |
| 4,673,249 A | * | 6/1987 | Schneider et al. | |
| 4,707,055 A | * | 11/1987 | Stark | |
| 4,822,972 A | | 4/1989 | Leighton | 219/121.67 |
| 4,828,371 A | | 5/1989 | McCaslin et al. | 350/421 |
| 4,850,686 A | | 7/1989 | Morimoto et al. | 350/484 |
| 4,902,117 A | * | 2/1990 | Papp | |
| 5,043,553 A | * | 8/1991 | Corfe et al. | |
| 5,483,342 A | * | 1/1996 | Rockwell | |
| 5,486,948 A | * | 1/1996 | Imai et al. | |
| 5,596,456 A | | 1/1997 | Luecke | 359/831 |

FOREIGN PATENT DOCUMENTS

| | | |
|---|---|---|
| EP | 0 499 421 A1 | 8/1992 |
| JP | 08286145 | 11/1996 |

OTHER PUBLICATIONS

PCT International Search Report & Transmittal PCT/US 00 40461, Feb. 2, 2001.

* cited by examiner

*Primary Examiner*—Ricky D. Shafer
(74) *Attorney, Agent, or Firm*—Greg H. Leitich (57) ABSTRACT

A counter-rotating anamorphic prism pair assembly with variable spacing allows the simultaneous adjustment of a prism pair using an adjustment member to circularize in cross section a range of elliptical laser beam cross sections. A first prism rotates and translates towards or away from an incident laser beam while a second prism simultaneously rotates towards or away from the laser beam in a fixed counter-rotating relationship with the first prism. The degree of rotation and translation is determined by a mechanical linkage connecting the two prisms.

14 Claims, 6 Drawing Sheets

COUNTER-ROTATING ANAMORPHIC PRISM ASSEMBLY WITH VARIABLE SPACING

BACKGROUND

1. Field of the Invention

This invention relates to optics, and more particularly to conversion of a laser beam with an elliptical cross section to a beam with a circular cross section.

2. Description of Related Art

Elliptically shaped (in cross section) light beams output from a laser can be converted into a more desirable circular beam by using a pair of prisms. The output beam from a laser is often in the cross-sectional shape of an ellipse; however, the elliptical shape does not lend itself to optimal performance of associated systems, thereby giving rise to various techniques for converting the elliptical beam into a circular one. Such beam conversion is useful, e.g., in laser beam scanning lithography where a group of parallel laser beams are modulated and scanned over a photosensitive medium to form an image on the medium. Applications are, for instance, in the semiconductor industry for lithography for integrated circuits.

These methods of converting such beam cross sections usually involve transmitting a laser beam through a pair of prisms and then rotating and translating the prisms in relation to each other until the desired cross section was achieved. An incident laser beam is applied to the prism pair, and then an iterative process begins of manipulating the prisms relative to each other. This not only increases post adjustment alignment time for downstream optics, but this also increases the complexity of downstream assemblies due to significant angular and transverse displacement of the output beam relative to the input beam. Therefore, there is a need to be able to quickly adjust an anamorphic prism pair to change the ellipticity of an input laser beam while minimizing angular and transverse beam displacements resulting from the adjustments.

SUMMARY

In accordance with the invention, the above problem is overcome by linking an anamorphic pair of prisms, where a first prism simultaneously rotates counter to a second prism, by mechanical linkages. An anamorphic assembly is an optical system providing two different magnifications along two perpendicular axes such as the present assembly where prisms convert an elliptically cross sectioned laser beam into a circularly shaped cross sectioned beam. The prisms are linked such that the first prism translates and rotates simultaneously towards or away from the axis of an input laser beam. Meanwhile, the second prism rotates towards or away from the axis of the input laser beam in a counter-rotating relationship with the first prism. These movements are effected by a single slide adjustment member which translates a slide upon which both prisms are attached.

A first prism mount, upon which the first prism is attached, has a distal end which is attached to the base and a proximal end which is attached to the slide. A second prism mount, upon which the second prism is attached, also has a distal end and a proximal end; however, this distal end is attached to the slide and the proximal end is attached to the base. This arrangement allows the simultaneous adjustment of both prisms using a single slide adjustment member while maintaining the circularity of an output beam cross section over a range of elliptical input beam cross sections. This arrangement also allows for minimizing the angular and transverse displacement of the output beam relative to the input beam.

Furthermore, there is an associated method of simultaneously adjusting a prism pair where a laser beam is input into the entrant face of the first prism, then the slide adjustment member is adjusted. This adjusting rotates and translates the first prism towards or away from the laser beam and rotates the second prism simultaneously towards or away from the laser beam in a fixed counter-rotating manner.

BRIEF DESCRIPTION OF THE DRAWINGS

Use of the same reference symbols in different figures indicates similar or identical items.

DETAILED DESCRIPTION

Figure 1:
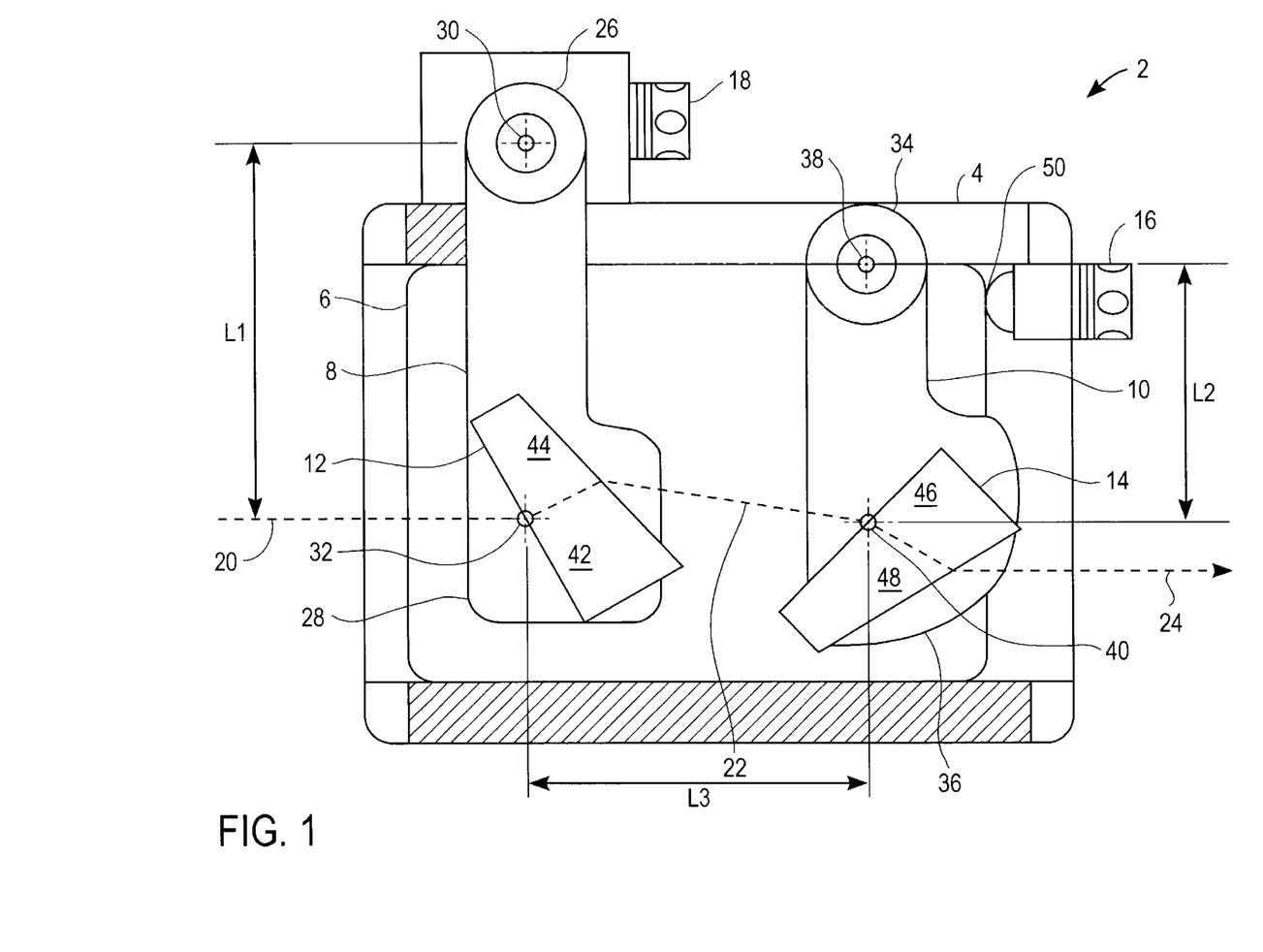
FIG. 1 shows a view of the present counter-rotating anamorphic prism assembly.

FIG. 1 illustrates an optical apparatus in accordance with this invention. The adjustable prism apparatus 2 has a base 4 which allows removal of an associated cover (not shown) and also allows easy access to the internal assembly contained within and which will be discussed in detail below. On base 4 is mounted a slide 6 which moves translationally over a specified range. Prism apparatus 2 further includes a first prism mount 8 and a second prism mount 10 mounted to base 4 and slide 6.

Slide 6 translates on base 4 by slide adjustment member 16, which is, e.g., an adjustment screw anchored to base 4 in this embodiment. Slide adjustment member 16 has a ball end facing towards slide 6 and can be translated towards or away from slide 6 by rotating it about its own axis. Slide 6 is maintained in contact with slide adjustment member 16 at contact point 50 by a small spring force (e.g., 4 lb. force, nominal) acting on slide 6 (the spring is not shown); slide 6 is not rigidly fastened to slide adjustment member 16 thus allowing the rotation of member 16 about its axis.

First prism mount 8 has two pivots located respectively at both its ends. First distal pivot 30 is located at the top of first prism mount 8, called first distal end 26, and first proximal pivot 32 is located at the lower end of first prism mount 8, called first proximal end 28. Furthermore, first distal pivot 30 is in contact with angular adjustment member 18, which is described in further detail below for FIG. 4. The first distal and proximal pivots 30, 32 are collinearly aligned in first prism mount 8, but this does not preclude noncollinear arrangements in other embodiments. First distal pivot 30 is secured onto base 4 near angular adjustment member 18, located at the top of base 4, and first proximal pivot 32 is secured onto slide 6. Also, first distal pivot 30 is held within a slotted channel in first prism mount 8 (slot is not shown) to allow the translation of slide 6. Second prism mount 10 also has two pivots located at both ends. Second distal pivot 38 is located near the top of prism mount 10 in second distal end 34 and second proximal pivot 40 is located near the bottom of prism mount 10 in second proximal end 36. Second distal and proximal pivots 38, 40 are also aligned collinearly, but again this does not preclude a noncollinear arrangement in other embodiments. In an opposite arrangement from first prism mount 8, second distal pivot 38 is secured onto slide 6 and second proximal pivot 40 is secured onto base 4. Second distal pivot 38 is also held within a slotted channel on second prism mount 10 (slot is not shown) to allow the translation of slide 6. All four pivots 30, 32, 38, 40 are fastened to either base 4 or slide 6 with, e.g., dowels (not shown) which allows the rotation of the prism mounts 8, 10 about their respective pivots. First distal pivot 30 is further attached to angular adjustment member 18 which is used to correct output laser beam 24 for manufacturing error in apparatus 2 or in input laser beam 20 angular errors. Operation of angular adjustment member 18 is described in greater detail below.

First prism 12 is mounted onto first prism mount 8 at first proximal end 28 with an adhesive in such a way that a first entrant face 42 of first prism 12 is substantially coplanar with first proximal pivot 32. Second prism 14 is also mounted onto second proximal end 36 in such a way that a second entrant face 46 is substantially coplanar with second proximal pivot 40. It is not necessary that first and second entrant faces 42, 46, respectively, and first and second proximal pivots 32, 40, respectively, are exactly coplanar. Both entrant faces 42, 46 and both proximal pivots 32, 40 may be non-coplanar but substantially close. Both prisms 12, 14 are of fused silica having an index of refraction of n=1.504 in one particular embodiment.

Figure 2:
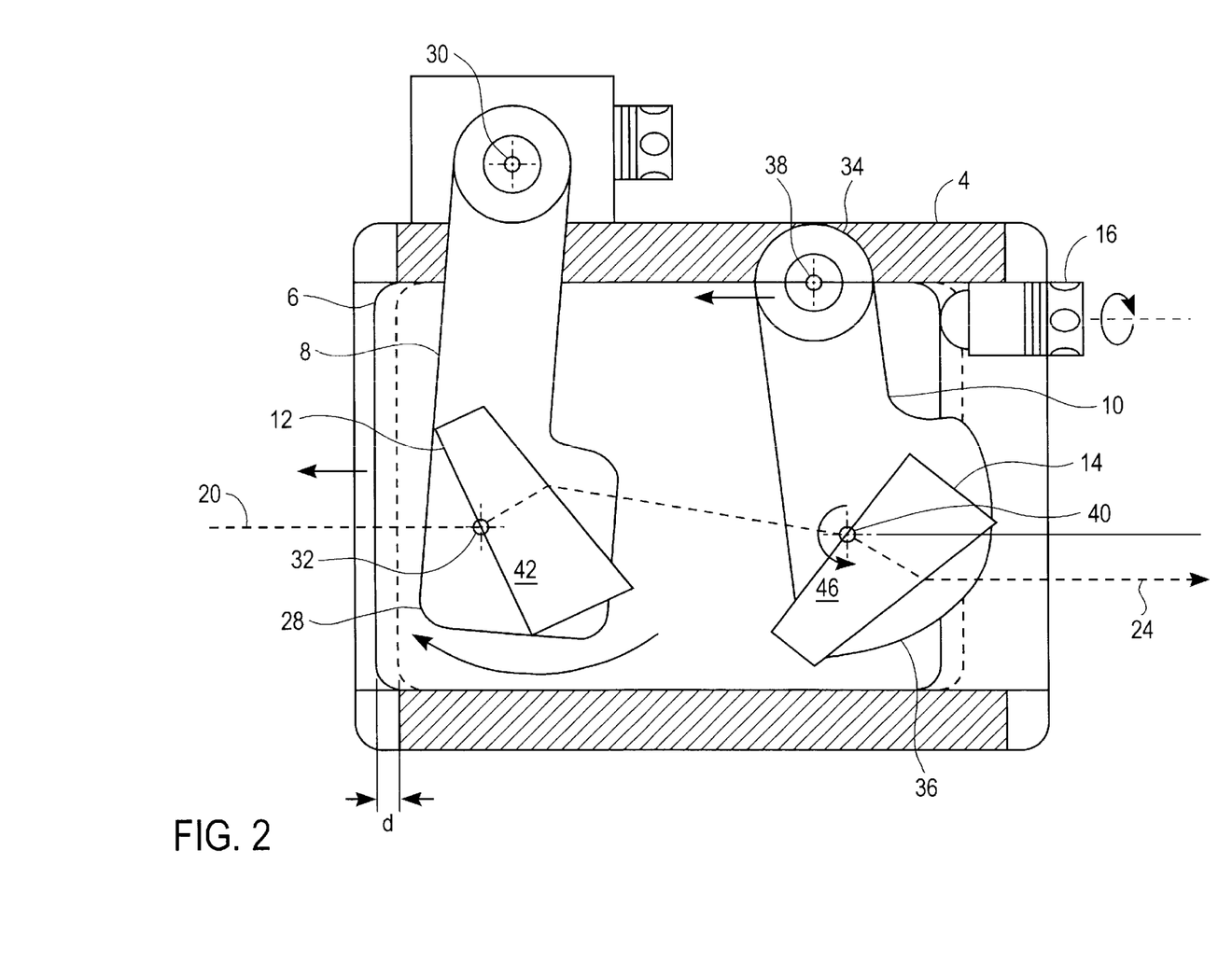
FIG. 2 shows a view of the FIG. 1 counter-rotating anamorphic prism assembly in the negative extreme position.

FIG. 2 shows the translation towards the negative extreme position of slide 6 through a distance, d, relative to base 4. As the input laser beam 20 (from a conventional laser source) is illuminated through first entrant face 42, slide adjustment member 16 is rotated about its axis to translate slide 6 parallel and towards input laser beam 20. This causes first prism mount 8 to rotate about first distal pivot 30 as first proximal end 28 rotates towards input laser beam 20. Simultaneously, second distal pivot 38 is linearly translated through distance, d, towards input laser beam 20. This in turn causes second prism mount 10 to rotate about second proximal pivot 40. The simultaneous rotations of first and second prism mounts 8, 10 result in the rotation and translation of first prism 12 and the rotation of second prism 14 in a counter-rotating manner.

Additionally, because first prism 12 and second 14 are mounted such that input laser beam 20 is incident upon entrant faces 42, 46 and perpendicularly to the axis of first and second proximal pivots 32, 40, respectively, a sweep of beams may also be applied in another embodiment. Such a sweep of beams is preferably illuminated upon first entrant face 42 such that the beams are coplanar with each other and this plane is parallel with the axis of first and second proximal pivots 32, 40, respectively. The true circularity of the resulting output laser beam 24 can be monitored with a change coupled device (CCD) camera (camera not shown) or any commercially available beam monitoring device. Such a camera can be utilized with a beam splitter and placed downstream of prism apparatus 2. In another embodiment, another type of conventional camera, utilized with a beam splitter, may be placed either upstream or downstream of prism apparatus 2, but it is preferable to locate a camera downstream to monitor the circularity of the cross section of output laser beam 24.

Figure 3:
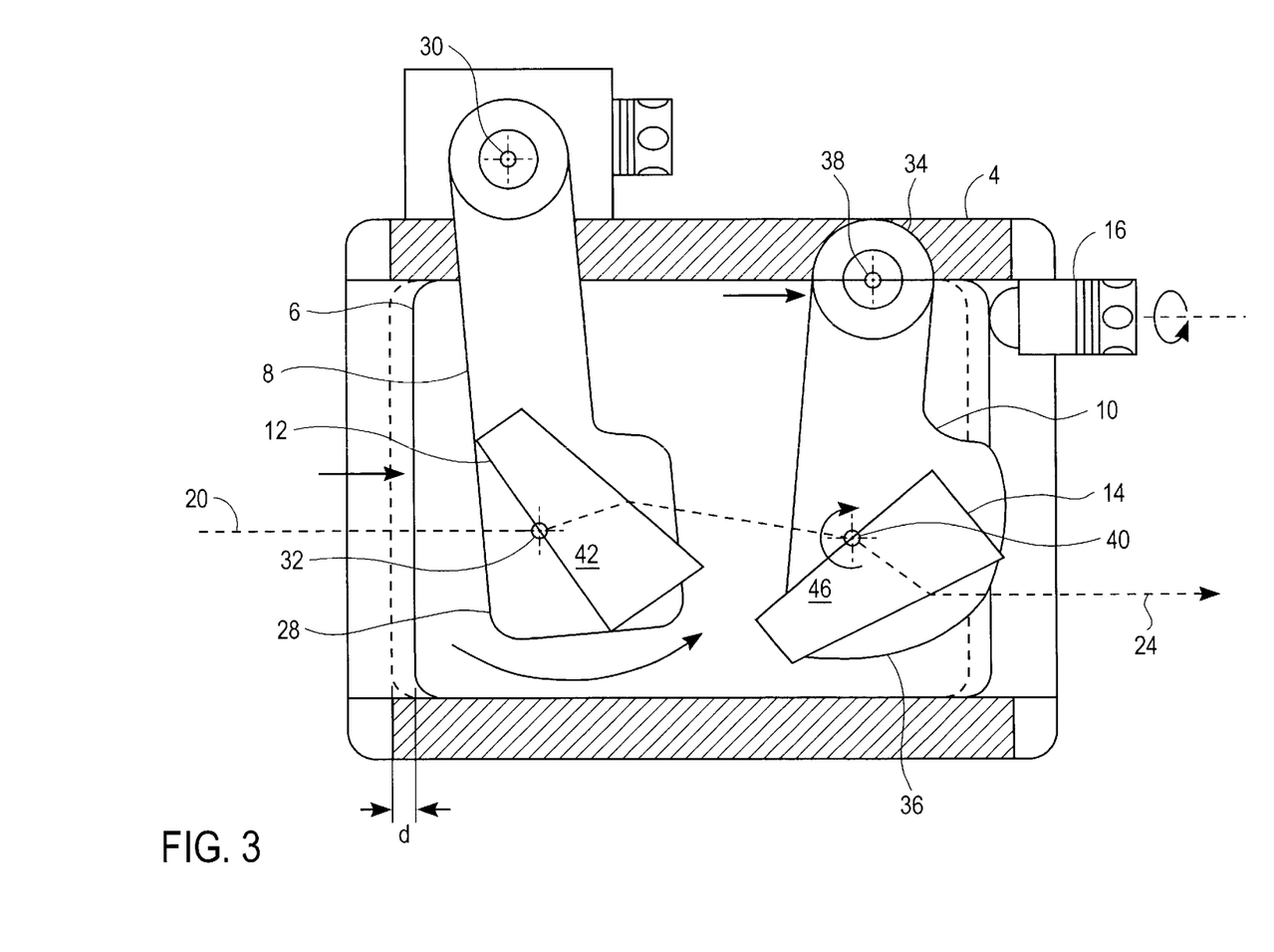
FIG. 3 shows a view of the counter-rotating anamorphic prism assembly of FIG. 1 in the positive extreme position.

FIG. 3 shows the translation towards the extreme positive position of slide 6 through a distance, d, relative to base 4. Again, as input laser beam 20 is illuminated through first entrant face 42, slide adjustment member 16 is rotated about its axis to translate slide 6 parallel and away from input laser beam 20. This causes first prism mount 8 to rotate about first distal pivot 30 as first proximal end 28 rotates away from input laser beam 20. Simultaneously, second distal pivot 38 is linearly translated through distance, d, away from input laser beam 20. Again, this causes second prism mount 10 to rotate about second proximal pivot 40 and the simultaneous rotations of first and second prism mounts 8, 10 further results in the rotation and translation of first prism 12 and the rotation of second prism 14 in a counter-rotating manner opposite from the direction as shown in FIG. 2.

Figure 4:
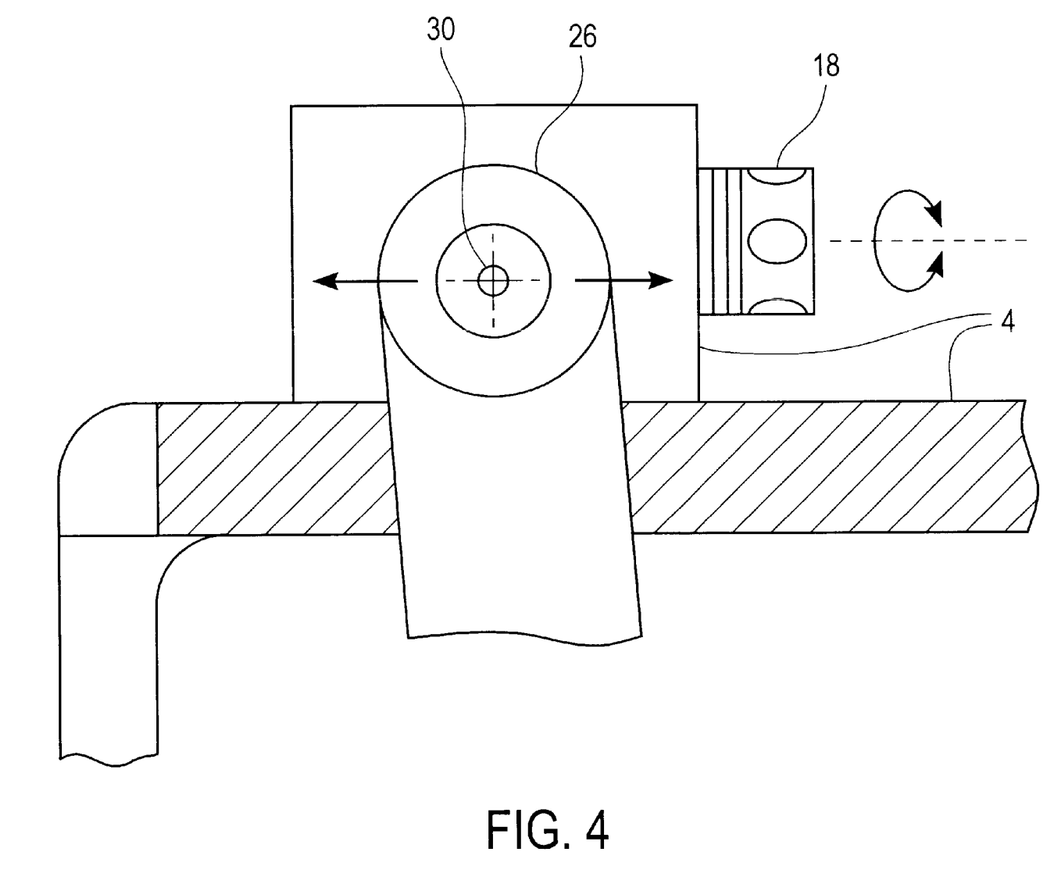
FIG. 4 shows a view of the angular adjustment member and the first distal pivot of FIG. 1.

FIG. 4 shows angular adjustment member 18 of FIG. 1 which is used to correct output laser beam 24 angle errors. Angular adjustment member 18 is shown as an adjustment screw which is screwed into base 4 in this embodiment. After slide 6 and prisms 12, 14 have been adjusted to circularize the cross-sectional area of input laser beam 20 (as discussed above for FIGS. 2 and 3), the axis of output laser beam 24 might deviate from the axis of input laser beam 20 due either to manufacturing errors in the mechanical linkages and prisms 12, 14 or in input laser beam 20 angular errors. Therefore, in order to keep the axis of output laser beam 24 substantially parallel with the axis of input laser beam 20, correction of output laser beam 24 angle is effected by rotating angular adjustment member 18 about its own axis. This rotation translates first distal pivot 30 in a parallel direction either towards or away from input laser beam 20 and this translation adjusts the angle of incidence for input laser beam 20 with first prism 12 to effect a beam correction.

Figure 5:
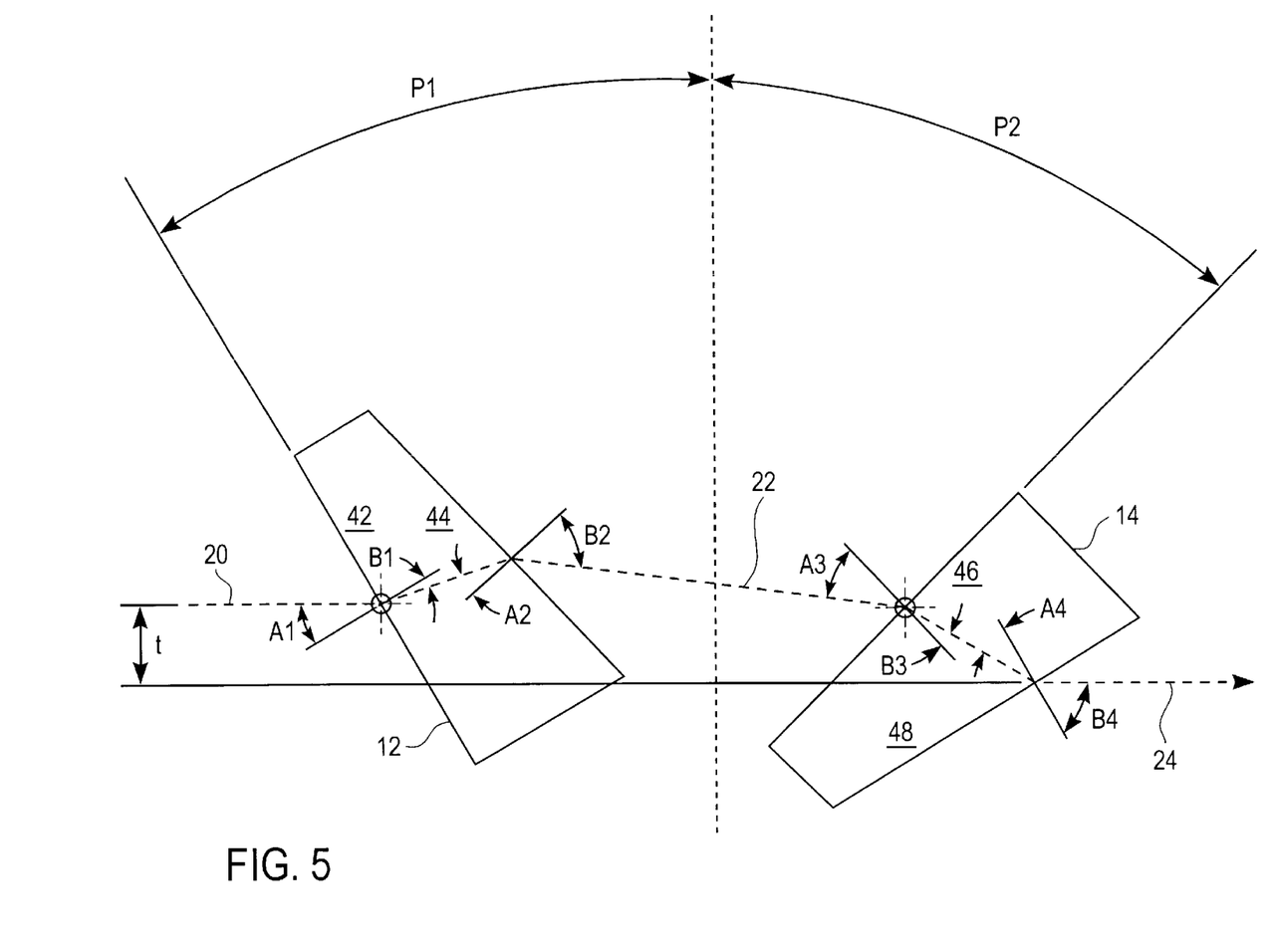
FIG. 5 shows a view of the anamorphic prism assembly, the transverse displacement of the laser beam, the angles of rotation of the prisms, and the angles of incidence and refraction of the laser beam through the assembly of FIG. 1.

FIG. 5 shows geometrically the relationship between first prism 12 and second prism 14. The input laser beam 20 enters first entrant face 42 at angle A1, which is the angle of incidence of input laser beam 20 at first entrant face 42. As input laser beam 20 passes through first prism 12, it defines angle B1, which is the angle of refraction of input laser beam 20 at first entrant face 42. Input laser beam 20 again refracts as it passes first refractant face 44 defining angle A2, which is the angle of incidence of input laser beam 20 at first refractant face 44, and angle B2, which is the angle of refraction of input laser beam 20 at first refractant face 44. Input laser beam 20 is designated intermediate refracted laser beam 22 as it passes from first prism 12 to second prism 14. This intermediate refracted beam 22 then enters second prism 14 defining angle A3, which is the angle of incidence of intermediate refracted laser beam 22 at second entrant face 46, and angle B3, which is the angle of refraction of intermediate refracted laser beam 22 at second entrant face 46. The angles of first prism 12 and second prism 14 are discussed in greater detail below. Finally, as intermediate beam 22 passes second refractant face 48, it defines angle A4, which is the angle of incidence of intermediate refracted laser beam 22 at second refractant face 48, and angle B4, which is the angle of refraction of intermediate refracted laser beam 22 at second refractant face 48. The initial input laser beam 20 enters first prism 12 and finally emerges from second prism 14 as output laser beam 24. The linear distance between where input laser beam 20 enters first entrant face 42 and where output laser beam 24 exits second refractant face 48 is the transverse displacement, t. Transverse displacement, t, is ideally held constant over the range of motion by prism apparatus 2. Furthermore, the angular difference between input laser beam 20 and output laser beam 24 is preferably minimized by prism apparatus 2 in maintaining an angular error of approximately 7.5 arc-min at the negative extreme in FIG. 2 and an angular error of approximately 6.0 arc-min at the positive extreme in FIG. 3.

Figure 6:
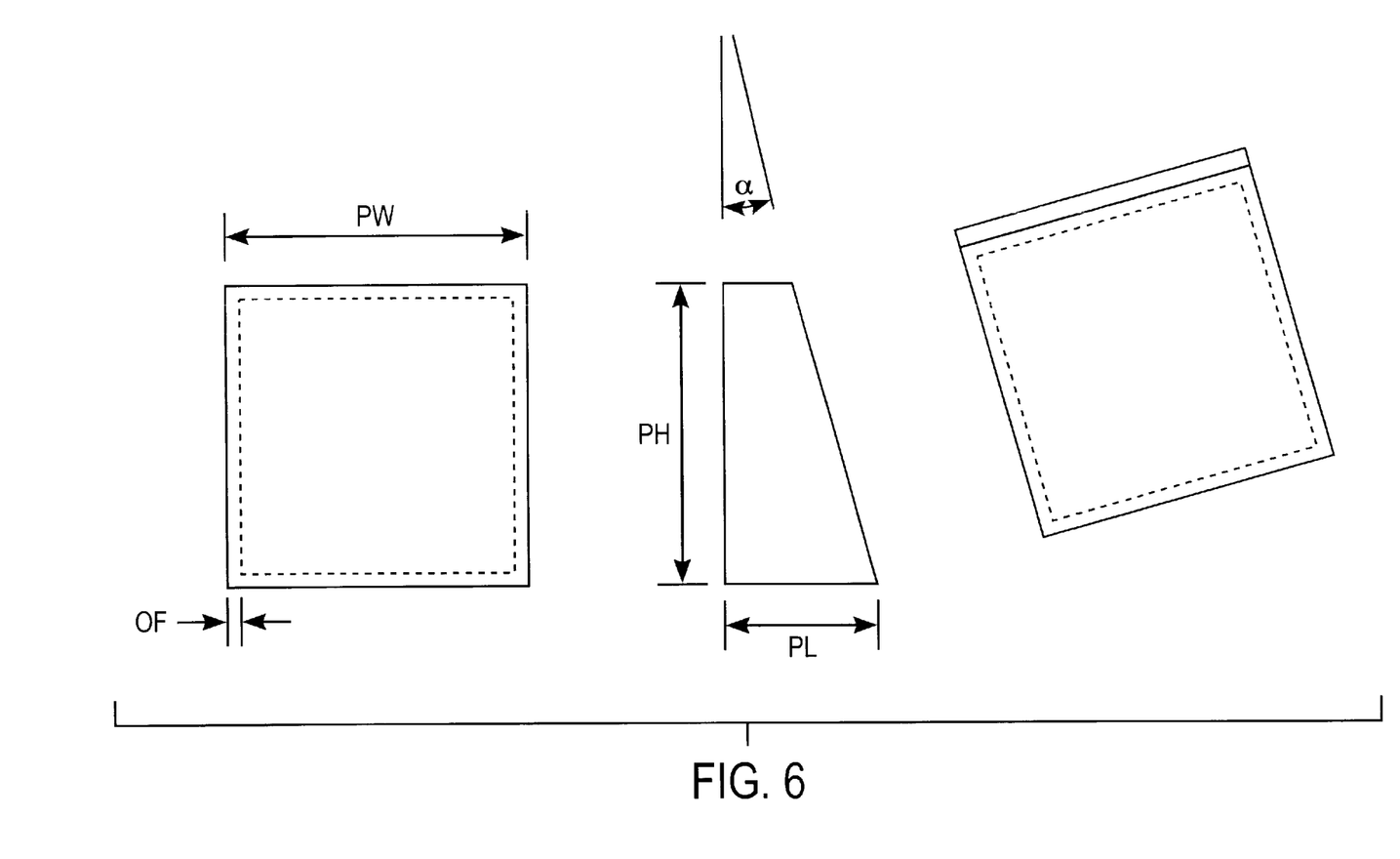
FIG. 6 shows a view of a prism and the incident area.

FIG. 6 shows the dimensions of first and second prisms 12, 14, respectively. Both prisms 12, 14, are defined by a prism height PH and a prism width PW which are preferably equal in one embodiment. Prisms 12, 14 are further defined by a prism length PL and an apex angle α. Furthermore, the preferable area upon which input laser beam 20 is incident upon first and second prism 12, 14, is bordered by outside frame OF. The prism material for this embodiment is fused silica. However, this does not preclude the use of other materials suitable for the use of prisms. The aforementioned dimensions for one embodiment are shown in the following table.

| Dimension | Value |
| --- | --- |
| α (degrees) | 15.37° |
| PH | 25.40 mm |
| PW | 25.40 mm |
| PL | 12.23 mm |
| OF | 3.00 mm |

The wavelength of input laser beam 20, which is to be circularized, is 257.25 nm in one particular embodiment. Because prism apparatus 2 circularizes elliptical laser beams with a variable transverse and lateral radius, apparatus 2 operates over a range of laser beam cross sections. Apparatus 2 is such that first and second prism mounts 8, 10, respectively, are in a nominal position when the transverse radius of the input laser beam 20 measures 0.435 mm and the lateral radius measures 0.223 mm. Slide adjustment member 16 may then be adjusted to translate slide 6 to the negative extreme position shown in FIG. 2 to accommodate a laser beam with a minimum transverse radius of 0.348 mm and to the positive extreme position shown in FIG. 3 to accommodate a maximum transverse radius of 0.522 mm, where both beams have a lateral radius of 0.223 mm. These varying transverse radii may be summarized by a scale factor in relation to the nominal radius of 0.435 mm, as shown in the following table. (These dimensions, of course, are only illustrative of one embodiment.)

| Transverse Radius (mm) | Lateral Radius (mm) | Scale Factor | Slide Position |
| --- | --- | --- | --- |
| 0.348 | 0.223 | 0.8 | Negative extreme |
| 0.435 | 0.223 | 1.0 | Nominal |
| 0.522 | 0.223 | 1.2 | Positive extreme |

The absolute value of change in rotation of PI, which is the angle between first entrant face 42 and a plane perpendicular to an axis of input laser beam 20, is related to the absolute value of translational distance, d, which slide 6 travels by the following:

$$\Delta\theta_{first\ prism} = \tan^{-1}(d/L_1)$$

where $L_1$ is the length from first distal pivot 30 to first proximal pivot 32. Likewise P2, which is the angle between second entrant face 46 and the plane perpendicular to an axis of input laser beam 20, is also related to the absolute value of translational distance, d, by the following:

$$\Delta\theta_{second\ prism} = \tan^{-1}(d/L_2)$$

where $L_2$ is the length from second distal pivot 38 to second proximal pivot 40. A third value, $L_3$, is the distance from first proximal pivot 32 to second proximal pivot 40. All three values, $L_1$, $L_2$, and $L_3$, are chosen to minimize the angular displacement and changes in transverse displacement, t, of output laser beam 24 over the above range of scale factors. The changes in rotation P1, P2 of first and second prisms 12, 14, respectively, are such that the changes occur in a counter-rotating manner as discussed above.

The relationship between the laser beam radii (scale factor), the transverse displacement, t, between input laser beam 20 and output laser beam 24, first prism 12 and second prism 14 orientation, and the angles of incidence and refraction from first prism 12 and second prism 14 (in degrees) is summarized in the following table.

| | Value by Scale Factor | | |
| --- | --- | --- | --- |
| Dimension | 0.8 | 1 | 1.2 |
| t (mm) | 0.2520619 | 0.2666618 | 0.2789777 |
| P1 | 22.800 | 28.600 | 31.700 |
| P2 | 33.491 | 41.700 | 46.098 |
| A1 | 22.800 | 28.600 | 31.700 |
| A2 | 30.304 | 33.933 | 35.824 |
| A3 | 22.307 | 28.594 | 31.513 |
| A4 | 29.991 | 33.929 | 35.711 |
| B1 | 14.934 | 18.563 | 20.454 |
| B2 | 49.354 | 57.076 | 61.655 |
| B3 | 14.621 | 18.559 | 20.341 |
| B4 | 48.733 | 57.067 | 61.366 |

Although the invention has been described with reference to particular embodiments, the description is only an example of the invention's application and should not be taken as a limitation. In particular, even though much of the preceding discussion is of a prism material of fused silica and a particular laser beam wavelength of 257.25 nm, alternative embodiments of this invention include various other prism materials and laser beam wavelengths. Various other adaptations and combinations of features of the embodiments disclosed are within the scope of the invention as defined by the following claims.

What is claimed is:

1. An optical apparatus, comprising:
   a base;
   a slide mounted on said base;
   a first prism mount attached to said base at a first pivot and said slide at a second pivot;
   a second prism mount attached to said base at a third pivot and said slide at a fourth pivot;
   a first prism attached to said first prism mount;
   a second prism attached to said second prism mount; and
   a slide adjustment member coupled to said slide to adjustably move said slide relative to said base and adjust said first prism and said second prism, whereby faces of said first prism and said second prism move in a fixed counter-rotating relationship.

2. The apparatus of claim 1, wherein said slide adjustment member moves said slide parallel to an axis of a laser beam directed onto said first prism and said first prism rotates and translates towards or away from said axis of said laser beam in a fixed relationship to said second prism.

3. The apparatus of claim 2, wherein said slide adjustment member moves said slide parallel to said axis of said laser beam and said second prism rotates towards or away from said axis of said laser beam in a fixed relationship to said first prism.

4. The apparatus of claim 1, further comprising an adjustment member attached to said base and coupled to said first prism mount.

5. The apparatus of claim 4, wherein said angular adjustment member adjusts an angle of said first prism mount relative to said base.

6. An optical apparatus, comprising:

a base;

a slide mounted on said base;

a first prism mount attached to said base;

a second prism mount attached to said slide;

a first prism attached to said first prism mount;

a second prism attached to said second prism mount; and a slide adjustment member coupled to said slide to adjustably move said slide relative to said base and adjust said first prism and said second prism, whereby faces of said first prism and said second prism move in a fixed counter-rotating relationship;

wherein said first prism mount has a first end and a second end, wherein:

said first end is attached by a first pivot to said base; and said second end is attached by a second pivot to said slide.

7. The apparatus of claim 6, wherein a face of said first prism is substantially coplanar with said first pivot.

8. The apparatus of claim 6, wherein a change in rotational angle of a first entrant face of said first prism, $\Delta\theta_{first\ prism}$, is obtained with a translational distance, d, in which said slide is displaced, and with a length from said pivot to said second pivot, $L_1$, by the following:

$$\Delta\theta_{first\ prism} = \tan^{-1}(d/L_1).$$

9. An optical apparatus, comprising:

a base;

a slide mounted on said base;

a first prism mount attached to said base;

a second prism mount attached to said slide;

a first prism attached to said first prism mount;

a second prism attached to said second prism mount; and a slide adjustment member coupled to said slide to adjustably move said slide relative to said base and adjust said first prism and said second prism, whereby faces of said first prism and said second prism move in a fixed counter-rotating relationship;

wherein said second prism mount comprises a first end and a second end, wherein:

said first end is attached by a first pivot to said slide; and said second end is attached by a second pivot to said base. substantially coplanar with said second pivot.

10. The apparatus of claim 9, wherein a face of said second prism is substantially coplanar with said second pivot.

11. The apparatus of claim 9, whereby a change in rotational angle of a second entrant face of said second prism, $\Delta\theta_{second\ prism}$, is obtained with translational distance, d, in which said slide is displaced, and with a length from said first pivot to said second pivot, $L_2$, by the following:

$$\Delta\theta_{first\ prism} = \tan^{-1}(d/L_2).$$

12. An optical apparatus, comprising:

a base;

a slide mounted movably on said base;

a first prism mount rotatably attached to said base at a first end and rotatably attached to said slide at a second end;

a second prism mount rotatably attached to said slide at a first end and rotatably attached to said base at a second end;

a first prism attached to said prism mount at said first end such that a face of said prism is substantially coplanar with a first proximal pivot;

a second prism attached to said second prism mount at said second end such that a face of said second prism is substantially coplanar with a second proximal pivot;

a slide adjustment member coupled to said base which adjustably moves said slide relative to said base wherein said slide moves parallel to an axis of a laser beam incident on said first prism and said first prism rotates and translates simultaneously in a fixed relationship to said second prism and said second prism rotates in a fixed relationship simultaneously with said first prism; and an angular adjustment member attached to said base and to said first prism mount wherein said angular adjustment member adjusts a location of said first end of said first prism mount.

13. An optical system, comprising:

a base;

a slide mounted on said base;

a first prism operably coupled to said base and said slide at first and second pivots;

a second prism operably coupled to said base and said slide at third and fourth pivots;

wherein said second prism is linked to said first prism by said slide such that adjusting a rotational or translational position of said first prism simultaneously adjusts a rotational position of said second prism; and wherein said first prism is coupled to said base and slide by a first mount, such that a distal end of said first mount is coupled to said base and a proximal end of said first mount is coupled to said slide.

14. An optical system comprising:

a base a slide mounted on said base;

a first prism operably coupled to said base and said slide;

a second prism operably coupled to said base and said slide;

wherein said second prism is linked to said first prism by said slide such that adjusting a rotational or translational position of said first prism simultaneously adjusts a rotational position of said second prism;

wherein said first prism is coupled to said base and slide by a first mount, such that a distal end of said first mount is couple to said base and a proximal end of said first mount is coupled to said slide; and wherein said second prism is coupled to said base and slide by a second mount, such that a distal end of said second mount is coupled to said base and a proximal end of said second mount is coupled to said slide.

* * * * *